United States Patent
Moayer et al.

(10) Patent No.: US 6,845,954 B1
(45) Date of Patent: Jan. 25, 2005

(54) KINEMATICALLY RECONFIGURABLE CAMERA MOUNT

(75) Inventors: Ali Moayer, Castro Valley, CA (US); Bryed Billerbeck, Mountain View, CA (US); Rod Mcafee, Pleasanton, CA (US)

(73) Assignee: Logitech Europe S.A., Romanel-sur-Morges (CH)

( * ) Notice: Subject to any disclaimer, the term of this patent is extended or adjusted under 35 U.S.C. 154(b) by 0 days.

(21) Appl. No.: 10/651,920

(22) Filed: Aug. 29, 2003

(51) Int. Cl.$^7$ .................. F16M 11/04; H04N 5/225; G03B 17/00
(52) U.S. Cl. .............. 248/187.1; 248/126; 348/373; D16/202; 396/428
(58) Field of Search ............. 248/187.1, 126, 248/346.06, 121, 166, 231.41; 348/373, 375; D16/202; 396/421, 419, 428

(56) References Cited

U.S. PATENT DOCUMENTS

| | | | | |
|---|---|---|---|---|
| 1,208,344 A | * | 12/1916 | McAli | 248/126 |
| D383,475 S | * | 9/1997 | Yamauchi et al. | D16/202 |
| 5,826,849 A | * | 10/1998 | Johnson et al. | 248/346.06 |
| 5,855,343 A | * | 1/1999 | Krekelberg | 248/121 |
| D442,202 S | * | 5/2001 | Pfeifer et al. | D16/202 |
| 6,239,841 B1 | * | 5/2001 | Verstockt et al. | 348/373 |
| 6,431,507 B2 | * | 8/2002 | Prather et al. | 248/166 |
| 6,481,681 B1 | * | 11/2002 | Stunkel et al. | 248/231.31 |
| D470,526 S | * | 2/2003 | Oliver et al. | D16/242 |
| D470,875 S | * | 2/2003 | Liao | D16/202 |
| D478,922 S | * | 8/2003 | Han | D16/202 |
| 6,663,066 B1 | * | 12/2003 | Hong | 248/231.41 |
| 6,679,463 B1 | * | 1/2004 | Chen | 248/126 |

* cited by examiner

*Primary Examiner*—Anita M. King
(74) *Attorney, Agent, or Firm*—Townsend Townsend and Crew LLP

(57) ABSTRACT

A simple, versatile support device supports a camera on different surfaces in various dispositions. In one embodiment, a device comprises a front support member including a left end and a right end. The front support member includes an upper surface having a camera support location between the left end and the right end on which to support a camera, and includes a lower inwardly arched surface and a bottom support surface below the lower inwardly arched surface. The front support member is configured to either rest the bottom support surface on a generally horizontal surface of an object on which to place the camera supporting device or to engage the lower inwardly arched surface with a vertical front surface and a horizontal top surface forming an edge of an object on which to place the camera supporting device. A left flexible leg is coupled between the left end of the front support member and a tail end. A right flexible leg is coupled between the right end of the front support member and the tail end. The left and right flexible legs are deformable to adjust a position of the tail end to mount the camera supporting device on the object by gravity without clamping to the object.

20 Claims, 1 Drawing Sheet

KINEMATICALLY RECONFIGURABLE CAMERA MOUNT

CROSS-REFERENCES TO RELATED APPLICATIONS

Not Applicable

BACKGROUND OF THE INVENTION

The present invention relates to devices for supporting a camera such as a video camera or a CCD (charge coupled device) camera and, more particularly, to a kinematically reconfigurable camera supporting device which mounts or rests on different objects of various shapes under gravity without clamping to the object.

Video cameras for computers have become increasingly common. For a CRT monitor having a sufficiently wide, generally planar surface on the top, a camera may be placed on the top surface using a flat support, a tripod structure, or the like. For a laptop computer, the display screen is relatively thin so that conventional structures typically do not provide stable support of the camera on the laptop screen or a flat panel screen and do not allow adequate adjustments to be made to position the camera easily and quickly. Some mounting devices are designed to support the camera on a CRT monitor and a flat panel LCD screen in different modes of operation. There remains a need for a camera mount that is easy to use and sufficiently versatile to stably support a camera on various surfaces including a flat surface and edge surfaces of flat screens or the like having a range of different thicknesses.

BRIEF SUMMARY OF THE INVENTION

Embodiments of the present invention are directed to a simple, versatile support frame for supporting a camera on different objects and surfaces in various dispositions. The support frame allows different adjustments to be quickly and easily made to position the camera as desired under gravity without clamping to the object.

In accordance with an aspect of the present invention, a device for supporting a camera on an object comprises a front support member including a left end and a right end. The front support member includes an upper surface having a camera support location between the left end and the right end on which to support a camera. The front support member includes a lower inwardly arched surface and a bottom support surface below the lower inwardly arched surface. The front support member is configured to either rest the bottom support surface on a generally horizontal surface of an object on which to place the camera supporting device or to engage the lower inwardly arched surface with a vertical front surface and a horizontal top surface forming an edge of an object on which to place the camera supporting device. A left flexible leg is coupled between the left end of the front support member and a tail end. A right flexible leg is coupled between the right end of the front support member and the tail end. The left flexible leg and the right flexible leg are deformable to adjust a position of the tail end with respect to the front support member to mount the camera supporting device on the object by gravity without clamping to the object.

In some embodiments, the tail end includes a tail weight which is higher in density than the left flexible leg and the right flexible leg. The left flexible leg comprises a left flexible coil and the right flexible leg comprises a right flexible coil. The flexible coils have shape memory under deformation. The front support member comprises a longitudinal support member having a length larger than a maximum horizontal dimension of the camera. The lower inwardly arched surface of the front support member comprises a horizontal support surface to engage the horizontal top surface of the object and a vertical support surface to engage the vertical front surface of the object. The tail end includes a tail weight which has a density equal to or higher than a density of the front support member. The left flexible leg and the right flexible leg are deformable to adjust the position of the tail end to contact a rear surface of the object to mount the camera supporting device on the object by gravity without clamping to the object. The tail end is disposed at or below the front support member in elevation to mount the camera supporting device on the object by gravity without clamping to the object.

In accordance with another aspect of the invention, a device for supporting a camera on an object comprises a front support member including a left end and a right end. The front support member includes an upper surface having a camera support location between the left end and the right end on which to support a camera. The front support member includes a lower inwardly cornered surface and a bottom support surface below the lower inwardly cornered surface. The front support member is configured to either rest the bottom support surface on a generally horizontal surface of an object on which to place the camera supporting device or to engage the lower inwardly cornered surface with a vertical front surface and a horizontal top surface forming an edge of an object on which to place the camera supporting device. A left flexible leg is connected to the left end of the front support member. A right flexible leg is connected to the right end of the front support member. A tail end is coupled with the left flexible leg and the right flexible leg. The tail end has a tail weight which is higher in density than the left flexible leg and the right flexible leg.

In some embodiments, the left flexible leg and the right flexible leg are deformable to adjust the position of the tail end to contact a rear surface of the object to mount the camera supporting device on the object by gravity without clamping to the object. The tail end is disposed at or below the front support member and the right and left flexible legs in elevation to mount the camera supporting device on the object by gravity without clamping to the object. The tail end includes a groove to receive a cable of the camera.

In accordance with another aspect of the present invention, a method of supporting a camera on an object comprises providing a camera supporting device having a front support member including a left end and a right end. A left flexible leg is connected to the left end of the front support member, a right flexible leg is connected to the right end of the front support member, and a tail end is coupled with the left flexible leg and the right flexible leg. The front support member includes a lower inwardly arched surface. The method further comprises attaching a camera on an upper surface of the front support member of the camera supporting device; placing the front support member of the camera supporting device on an object to engage the lower inwardly arched surface with a vertical front surface and a horizontal top surface forming an edge of the object; and deforming the left flexible leg and the right flexible leg to adjust a position of the tail end with respect to the front support member to contact a rear surface of the object to mount the camera supporting device on the object by gravity without clamping to the object.

DETAILED DESCRIPTION OF THE INVENTION

Figure 1:
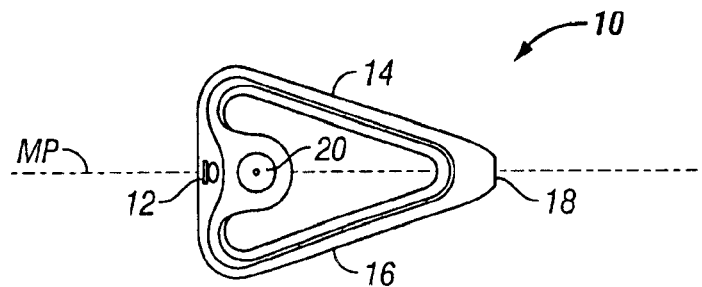
FIG. 1 is a top plan view of a camera supporting device according to an embodiment of the present invention.
Figure 2:
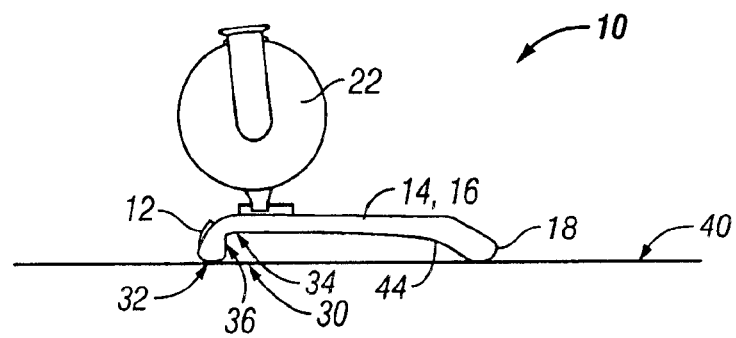
FIG. 2 is a side elevational view of the camera supporting device of FIG. 1 supporting a camera on a generally planar surface of an object.

As shown in FIGS. 1 and 2, a camera supporting device 10 includes a front support member 12, a right flexible leg 14, a left flexible leg 16, and a tail end 18. The right flexible leg 14 is coupled between the right end of the front support member 12 and the tail end 18. The left flexible leg 16 is coupled between the left end of the front support member 12 and the tail end 18. The front support member 12 includes an upper surface having a camera support location 20 between the left end and the right end on which to support a camera 22. For instance, a ball-in-socket connection can be made between a ball provided at the bottom of the camera 22 and a socket provided at the camera support location 20. Such a connection will allow the camera 22 to rotate in various directions (tilting, panning, etc.) with respect to the camera supporting device 10 to point the camera 22 in a desirable direction. The camera support location 20 is typically disposed in the middle between the right end and the left end of the front support member 12. The camera supporting device 10 may be symmetrical with respect to a mid-plane MP, which intersects the camera support location 20 and tail end 18.

The front support member 12 is typically a longitudinal support member. As best seen in FIG. 2, the front support member 12 includes a lower inwardly arched or cornered surface 30, and a bottom support surface 32 disposed below the lower inwardly arched surface 30. The inwardly arched surface 30 may include an L-shaped arch or corner as shown or a more curved arch. In the specific embodiment shown, the lower inwardly arched surface 30 includes a horizontal support surface 34 facing downward and a vertical support surface 36 facing rearward.

The right flexible leg 14 and the left flexible leg 16 are deformable to adjust the position of the tail end 18 with respect to the front support member 12. The flexible legs 14, 16 may be made of flexible coils which are overmolded to provide a smooth exterior surface. An elastic overmold enhances product stiffness and stability. To form the overmold, the flexible coils are desirably pre-lined with a thin MYLAR, PVC, or the like to prevent the mold material from entering the grooves of the flexible coils and degrading the flexibility of the legs 14, 16. Injection molding may then be used to form the elastic overmold. The flexible legs 14, 16 preferably have shape memory under deformation, so that they retain their shapes until the user adjusts the deformation to different shapes. Such flexible coils are available, for instance, from Uniprise International Inc. of Terryville, Conn.

The tail end 18 desirably includes a tail weight which provides a more stable mounting of the camera supporting device to an object by gravity. The tail weight may be about 30–60 grams. The density of the tail weight is desirably higher than the density of the flexible legs 14, 16, and may be the same or higher than the density of the front support member 12.

FIG. 2 shows the camera supporting device 10 disposed on an object having a generally horizontal surface 40 such as a CRT monitor. The bottom support surface 32 of the front support member 12 and the tail end 18 make contact with the generally horizontal surface 40. The bottom support surface 32 may contact the generally horizontal surface 40 across the length of the front support member 12 between the left end or the right end. Alternatively, the bottom support surface 32 may contact the generally horizontal surface 40 at a surface portion near the left end and another surface portion near the right end if the middle portion of the bottom support surface 32 curves upward. The camera supporting device 10 rests on the generally horizontal surface 40 under gravity without clamping to the object. The tail end 18 is disposed at or below the front support member 12 in elevation, or at or below the rest of the camera supporting device 10 in elevation. The cable 44 of the camera 22 maybe inserted through a space near the tail end 18 between the right flexible leg 14 and the left flexible leg 16. A groove 46 may be provided at the tail end 18 to receive the cable. The intersection of the flexible legs 14, 16 at the tail end 18 allows incorporation of this integrated cable management feature.

Figures 3, 4, 5:
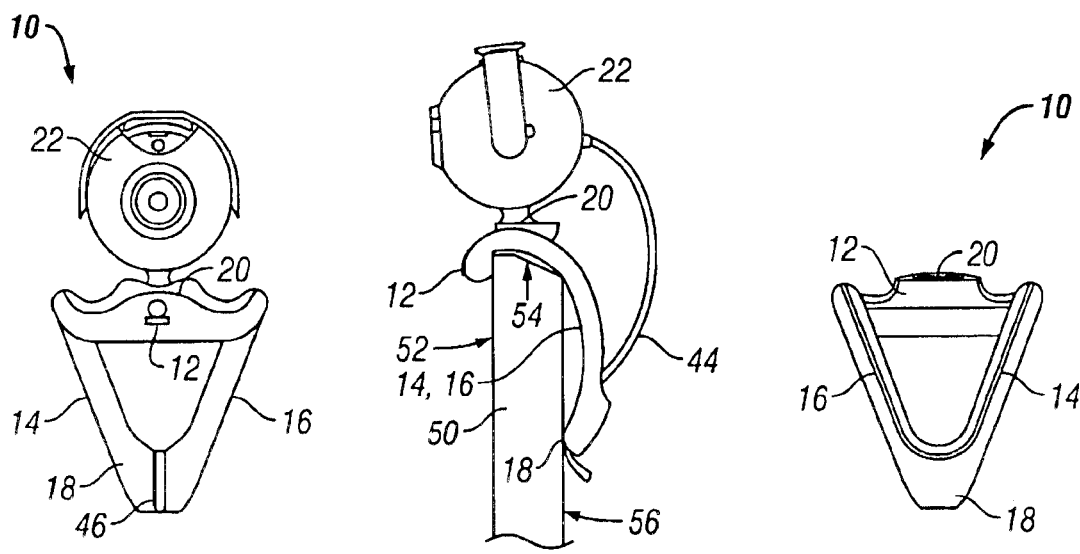
FIG. 3 is front elevational view of the camera supporting device of FIG. 1 supporting a camera on a top edge of an object.
FIG. 4 is a side elevational view of the camera supporting device of FIG. 3.
FIG. 5 is a rear elevational view of the camera supporting device of FIG. 3.

In FIGS. 3–5, the camera supporting device 10 is disposed on a top edge of an object 50 such as a flat panel screen. The lower inwardly arched surface 30 engages a vertical front surface 52 and a horizontal top surface 54 forming an edge of the object 50. More specifically, the horizontal support surface 34 of the front support member 12 engages the horizontal top surface 54 and the vertical support surface 36 of the front support member 12 engages the vertical front surface 52. The flexible legs 14, 16 are deformable to adjust the position of the tail end 18 to contact a rear surface 56 of the object 50 to mount the camera support device 10 on the object 50 by gravity without clamping to the object. The tail end 18 is disposed below the front support member 12 in elevation, or at or below the rest of the camera supporting device 10 in elevation. As seen in FIG. 3, the front support member 12 may have a length larger than a maximum horizontal dimension of the camera 22 to provide a more stable support for the camera 22. FIG. 4 shows the integrated cable management feature for the cable 44 of the camera 22 as described above.

The flexible legs 14, 16 of the camera supporting device 10 is user hand-configurable, and have shape memory to hold their positions upon release. The camera supporting device 10 is self-stabilizing under gravity, and provides independent adjustment in six degrees of freedom (three translation and three rotational) to place the camera on flat or uneven surfaces. The kinematically reconfigurable device 10 is easy to use and adjust with no clamping.

The above-described arrangements of apparatus and methods are merely illustrative of applications of the principles of this invention and many other embodiments and modifications may be made without departing from the spirit and scope of the invention as defined in the claims. For example, the shapes and sizes of the components that form the camera supporting device may be changed. The scope of the invention should, therefore, be determined not with reference to the above description, but instead should be determined with reference to the appended claims along with their full scope of equivalents.

What is claimed is:

1. A device for supporting a camera on an object, the device comprising:

a front support member including a left end and a right end, the front support member including an upper surface having a camera support location between the left end and the right end on which to support a camera, the front support member including a lower inwardly arched surface and a bottom support surface below the lower inwardly arched surface, the front support member being configured to either rest the bottom support surface on a generally horizontal surface of an object on which to place the camera supporting device or to engage the lower inwardly arched surface with a vertical front surface and a horizontal top surface forming an edge of an object on which to place the camera supporting device;

a left flexible leg coupled between the left end of the front support member and a tail end; and a right flexible leg coupled between the right end of the front support member and the tail end;

wherein the left flexible leg and the right flexible leg are deformable to adjust a position of the tail end with respect to the front support member to mount the camera supporting device on the object by gravity without clamping to the object.

2. The device of claim 1 wherein the tail end includes a tail weight which is higher in density than the left flexible leg and the right flexible leg.

3. The device of claim 1 wherein the left flexible leg comprises a left flexible coil and the right flexible leg comprises a right flexible coil.

4. The device of claim 3 wherein the flexible coils have shape memory under deformation.

5. The device of claim 1 wherein the front support member comprises a longitudinal support member having a length larger than a maximum horizontal dimension of the camera.

6. The device of claim 1 wherein the lower inwardly arched surface of the front support member comprises a horizontal support surface to engage the horizontal top surface of the object and a vertical support surface to engage the vertical front surface of the object.

7. The device of claim 1 wherein the tail end includes a tail weight which has a density equal to or higher than a density of the front support member.

8. The device of claim 1 wherein the left flexible leg and the right flexible leg are deformable to adjust the position of the tail end to contact a rear surface of the object to mount the camera supporting device on the object by gravity without clamping to the object.

9. The device of claim 1 wherein the tail end is disposed at or below the front support member in elevation to mount the camera supporting device on the object by gravity without clamping to the object.

10. A device for supporting a camera on an object, the device comprising:

a front support member including a left end and a right end, the front support member including an upper surface having a camera support location between the left end and the right end on which to support a camera, the front support member including a lower inwardly cornered surface and a bottom support surface below the lower inwardly cornered surface, the front support member being configured to either rest the bottom support surface on a generally horizontal surface of an object on which to place the camera supporting device or to engage the lower inwardly cornered surface with a vertical front surface and a horizontal top surface forming an edge of an object on which to place the camera supporting device;

a left flexible leg connected to the left end of the front support member;

a right flexible leg connected to the right end of the front support member, and a tail end coupled with the left flexible leg and the right flexible leg, the tail end having a tail weight which is higher in density than the left flexible leg and the right flexible leg.

11. The device of claim 10 wherein the tail weight has a density equal to or higher than a density of the front support member.

12. The device of claim 10 wherein the left flexible leg and the right flexible leg have shape memory under deformation.

13. The device of claim 10 wherein the left flexible leg and the right flexible leg are deformable to adjust the position of the tail end to contact a rear surface of the object to mount the camera supporting device on the object by gravity without clamping to the object.

14. The device of claim 10 wherein the tail end is disposed at or below the front support member and the right and left flexible legs in elevation to mount the camera supporting device on the object by gravity without clamping to the object.

15. The device of claim 10 wherein the tail end includes a groove to receive a cable of the camera.

16. A method of supporting a camera on an object, the method comprising:

providing a camera supporting device having a front support member including a left end and a right end, a left flexible leg connected to the left end of the front support member, a right flexible leg connected to the right end of the front support member, and a tail end coupled with the left flexible leg and the right flexible leg, the front support member including a lower inwardly arched surface;

attaching a camera on an upper surface of the front support member of the camera supporting device;

placing the front support member of the camera supporting device on an object to engage the lower inwardly arched surface with a vertical front surface and a horizontal top surface forming an edge of the object; and deforming the left flexible leg and the right flexible leg to adjust a position of the tail end with respect to the front support member to contact a rear surface of the object to mount the camera supporting device on the object by gravity without clamping to the object.

17. The method of claim 16 further comprising providing a tail weight in the tail end which is higher in density than the left flexible leg, the right flexible leg, and the front support member.

18. The method of claim 16 wherein placing the front support member comprises engaging a horizontal support surface of the lower inwardly arched surface with the horizontal top surface of the object and engaging a vertical support surface of the lower inwardly arched surface with the vertical front surface of the object.

19. The method of claim 16 wherein the tail end is positioned at or below the front support member in elevation to mount the camera supporting device on the object by gravity without clamping to the objects.

20. The method of claim 16 further comprising inserting a cable of the camera through a space near the tail end between the left flexible leg and the right flexible leg.

* * * * *